Sept. 7, 1937.  W. EGER  2,092,304

FISH LURE

Filed July 27, 1936

William Eger, INVENTOR

BY Victor J. Evans & Co.

ATTORNEYS

Patented Sept. 7, 1937

2,092,304

UNITED STATES PATENT OFFICE 2,092,304

FISH LURE

William Eger, Bartow, Fla.

Application July 27, 1936, Serial No. 92,897

1 Claim. (Cl. 43—46)

This invention relates to fish lures and has for an object to provide more particularly a more enticing lure than ordinary lures that are merely painted to resemble live bait, and to this end the invention contemplates a process and an article in which the natural skin of a frog is used as a covering for the plug or other body of the lure.

A further object is to provide a more lasting and serviceable fish lure than an ordinary painted lure, the natural water proofing inherent in the frog skin tending to preserve the wood or other material forming the body of the lure and prevent spreading and cracking.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1:
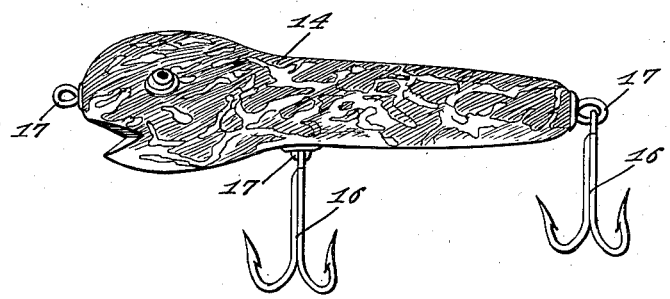
Figure 1 is a side elevation of a fish lure constructed in accordance with the invention.
Figure 2:
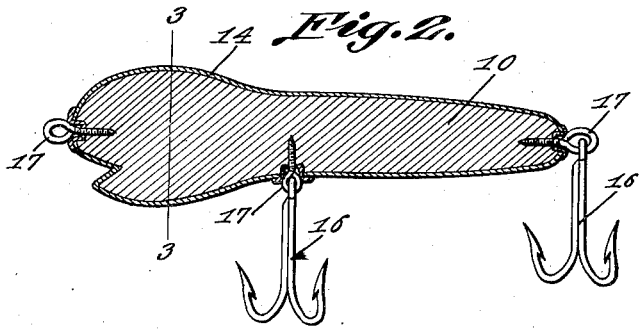
Figure 2 is a longitudinal sectional view of the lure shown in Figure 1.
Figure 3:
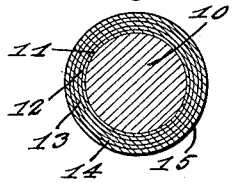
Figure 3 is a cross sectional view taken on the line 3—3 of Figure 2 and showing in diagrammatic form the various coatings performed in sequence during manufacture.

In tanning the frog skins, for use in connection with fish lures, the skins are removed from frogs by cutting off the heads and stripping the skins back so that they are removed in one piece. The skins are then treated in a solution of formaldehyde and alum and they are then packed in dry salt until they are to be used. Upon removing the skins from the dry salt they are washed in alcohol.

To manufacture the lure a plug 10 of wood or other material, buoyant or otherwise, is given a water proof coating 11 of oil which will permeate the pores of the wood to a certain extent. Next a water proof coat 12 of lacquer is applied to the plug to provide a smooth, hard coat of sufficient firmness to support the delicate frog skin smoothly without wrinkles or torsional stresses. Next a coat 13 of liquid marine cement is applied evenly to the lacquered surface of the plug.

The frog skin 14, cured as above described, is then applied to the cement coat on the plug, care being taken to firmly press together any breaks that may appear so that the entire plug is encased in an unbroken natural frog skin which presents to the eye all of the original colors of the amphibian. The frog skin is inherently water proof and tends by this characteristic to promote the long life and durability of the lure by preventing drying out and cracking of the plug.

To complete the lure after the frog skin is smoothly cemented to the plug, it is dried by the use of an air blast maintained at a predetermined temperature. When the frog skin is thoroughly dry it may be given a coat 15 of clear lacquer if desired, the lacquer coating tending to some extent to penetrate the natural pores of the frog skin and bond the skin throughout to the cement coating on the plug. Finally the hooks 16 and eye screws 17 are affixed to the plug to complete the lure, and it will be pointed out that the eye screws 17 at the front and rear ends of the lure pass through washers 18. These washers clamp the frog skin firmly against the lure body and positively prevent any tendency of the skin to unravel from the lure body. The washers also perform the additional function of preventing access of water to the lure body.

In use, the frog skin imparts to the artificial bait a more life like and attractive appearance than hitherto possible by painting, in the manufacture of artificial fish lures. The tanning of the frog skin prior to use is essential to impart highly desirable imperishable characteristics to the lure.

What is claimed is:

A fish lure comprising an elongated body, a tanned frog skin applied to the entire superficial area of the body, eye screws applied to the front end and to the rear end of the body, and washers surrounding the eye screws and engaged tightly against the frog skin, said washers performing the dual function of clamping the frog skin firmly against the lure body to prevent any tendency of the frog skin unraveling from the lure body and also positively preventing access of water to the lure body.

WILLIAM EGER.